Jan. 1, 1957    M. R. SOMMERIA    2,776,401
WELDING SYSTEM
Filed May 3, 1954    2 Sheets-Sheet 2

INVENTOR.
Marcel R. Sommeria
BY
Mueller & Aichele
Attys.

United States Patent Office

2,776,401
Patented Jan. 1, 1957

2,776,401

WELDING SYSTEM

Marcel R. Sommeria, Palos Heights, Ill., assignor to Welding Research, Inc., Chicago, Ill., a corporation of Illinois Application May 3, 1954, Serial No. 427,045

11 Claims. (Cl. 323—58)

This invention relates generally to welding systems and more particularly to a circuit for providing welding current from a three-phase alternating current source.

In resistance welding operations extremely large currents are drawn and large amounts of power are therefore consumed. It is desirable to obtain this power from commercial three-phase sources and welding systems operating from three-phase sources are in general use. Systems of this type are disclosed and claimed in David Sciaky Patents Nos. 2,415,708, 2,431,083 and 2,474,866.

To provide certain welding action, it is necessary to provide large direct currents of relatively long duration. To obtain such currents from alternating current sources requires very large transformers so that the current is not reduced as the transformer core becomes saturated. This has resulted in quite large machines and has made it necessary to limit the duration of weld cycles and therefore limit the welding processes which can be performed.

Although the use of a plurality of current pulses is satisfactory in some welding operations, intermittent pulses of current do not have the same effect as long continuous pulses unless the interruption therebetween is so small that the weld does not cool substantially between pulses. In prior systems it has not been possible to provide rapid reversals of current so that when a continuous welding action was required it was necessary to provide a single continuous current pulse.

It is therefore an object of the present invention to provide an improved three-phase welding system.

A further object is to provide a more efficient welding circuit which permits the use of smaller and less expensive equipment.

Another object of the invention is to provide a three-phase welding system wherein extremely rapid reversals of current can be obtained.

A feature of the present invention is the provision of a three-phase welding circuit wherein rectifiers are connected in series with inductor means and primary windings directly across a three-phase source, with the inductor means permitting rapid reversal of current to the windings as rectifiers of opposite polarity are selectively rendered conducting.

A further feature of the invention is the provision of a three-phase rectifier circuit for supplying direct current to welding electrodes, wherein rectifier elements of opposite polarity are connected through inductors to each phase of the source and controls are provided for rendering the rectifiers conductive during predetermined portions of each cycle of the current so that rapid reversals of current are provided in the welding electrodes.

Another feature of the invention is the provision of a welding system for providing high direct currents in welding electrodes, wherein rapid reversals of current are provided through a cycloconverter frequency changing system controlled by a phase shifting structure which produces pulses for actuating current supplying rectifiers, with the phase shifting structure being controlled in accordance with the current wave required in the welding electrodes.

Further objects, features and the attending advantages of the invention will be apparent from a consideration of the following description when taken in connection with the accompanying drawings wherein.

In practicing the invention there is provided a three-phase welding current supply circuit which requires only a single power transformer. The transformer includes three primary windings and a secondary winding which is connected to the welding electrodes. Each of the primary windings is connected in series with inductors and oppositely poled rectifiers across one phase of the power supply. The inductors may be provided by center tapped coils with a portion connected to the rectifier of each polarity, and all the inductors may be included on a single core. The rectifiers are of the ignitron type having control electrodes for controlling the conductivity thereof. A control circuit is provided including a thyratron tube connected to the control electrode of each ignitron, with the thyratrons being in turn connected to voltage pulse producing means which provides voltage pulses controlled in phase with respect to the three-phase source. The phase of the voltage pulses may be controlled by a system which operates in accordance with the desired welding current wave form.

Figure 1:
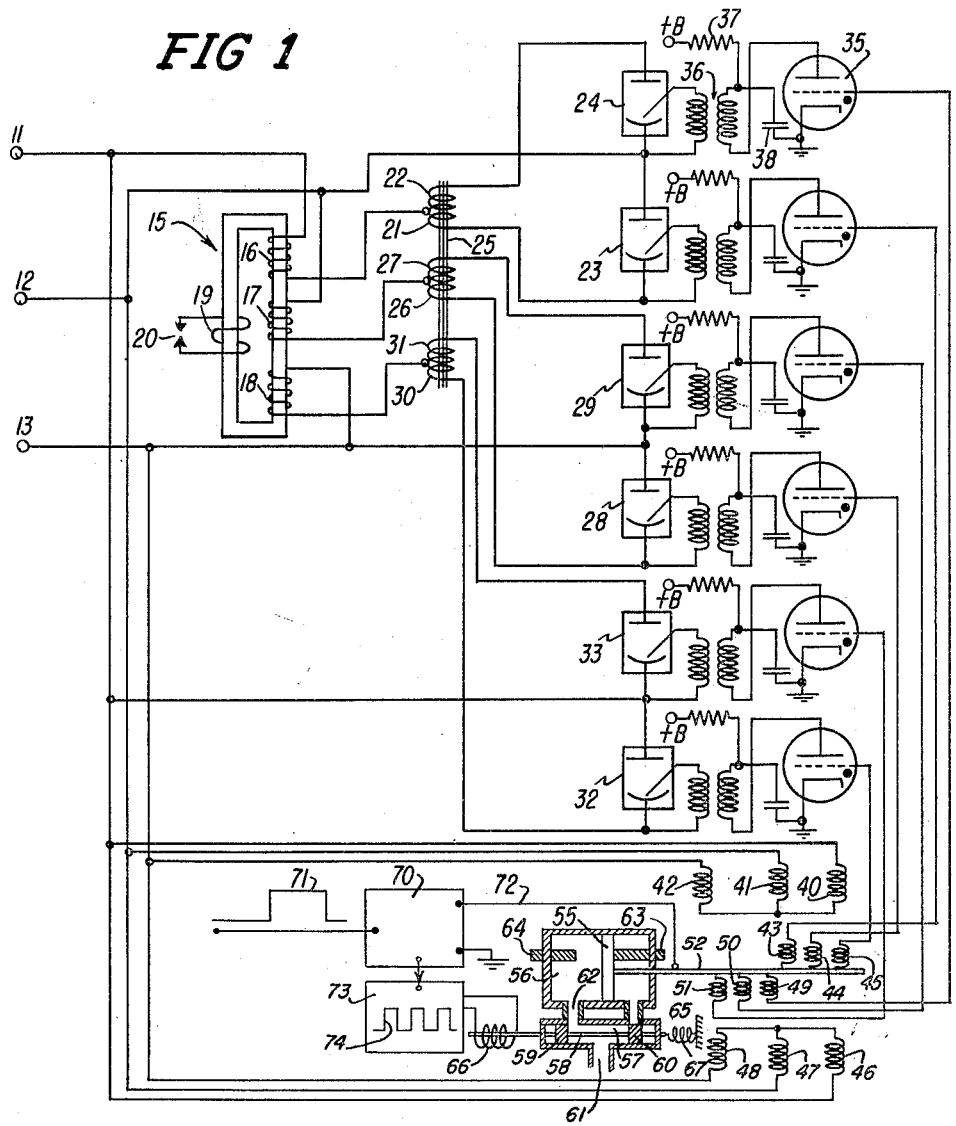
Fig. 1 is a circuit diagram of the system.
Figure 2:
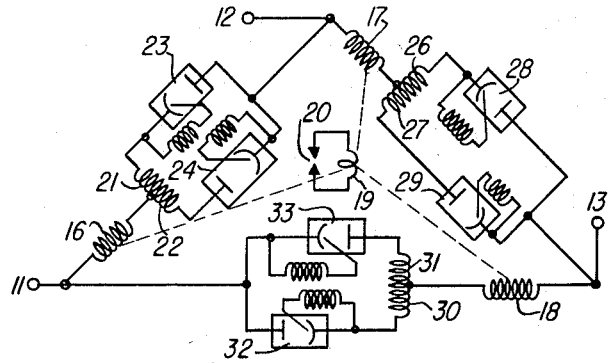
Fig. 2 is a simplified circuit showing connections to the power source and to the welding electrodes.

For a detailed consideration of the system reference is made to Figs. 1 and 2 which show the circuit diagrams. Fig. 2 is an exact duplicate of Fig. 1 as to wiring connections, but illustrates better the connection of the welding transformer primary windings in series with the inductors and the ignitrons to the three-phase source. This connection is a delta connection with each primary winding being connected across one phase. Fig. 1 shows the complete system including the connection of the control circuits to the ignitrons. As previously stated, the system is adapted to operate from a three-phase source and includes terminals 11, 12 and 13 for connection to the source. The main welding transformer 15 includes primary windings 16, 17 and 18 connected to the phases of the source, and a secondary winding 19 which is connected to the welding electrodes 20.

The primary winding 16 is connected across the first phase applied between terminals 11 and 12 through the circuit including inductors 21 and 22 and ignitrons 23 and 24. The inductors 21 and 22 may be formed by a single center tapped coil provided on core 25. Similarly the winding 17 is connected across the second phase provided between terminals 12 and 13, being connected in series with inductors 26 and 27 and ignitrons 28 and 29. The third secondary 18 is connected across the third phase between terminals 13 and 11 in the same way, being connected in series with inductors 30 and 31 and ignitrons 32 and 33. The inductors 26 and 27, and 30 and 31, may be formed by center tapped coils all on the same core 25 with the inductors 21 and 22.

The ignitrons 23, 24, 28, 29, 32 and 33 may be selectively rendered conducting by application of voltage pulses to the control electrodes thereof, with the rectifiers supplying current to the transformer 15 by rectifier action if fired at times when the phase angle is in the positive half cycle between 30° and 120° from the beginning of the cycle. The ignitrons may conduct energy from the transformer to the source through inverter action if fired at phase angles beginning at 120° in the positive half cycle and extending into the negative half cycle to a phase angle of 210° from the beginning of the cycle. When rendered conducting, each ignitron will conduct for 120°. Similar operation is described in my copending application Serial No. 293,121, filed June 12, 1952. The ignitrons are each controlled by a circuit connected to the control electrode thereof which includes a thyratron tube 35 and a coupling transformer 36. B plus operating potential is applied through resistor 37 connected in series with condenser 38 to charge the same. The primary winding of transformer 36 is connected across condenser 38, and when the thyratron 35 is rendered conducting, the condenser is rapidly discharged and may actually swing negative until it is again charged positive from B plus. This produces a sharp voltage pulse which is applied through transformer 36 to the control electrode of the ignitron to fire the same.

For controlling the exact time that the thyratrons are conducting to render the associated ignitrons also conducting, there is provided a structure connected to the three-phase source for producing pulses the phase of which can be shifted with respect to the phase of the source. Three coils 40, 41 and 42 connected to the three-phase source in a Y connection provide a field in which pickup coils 43, 44 and 45 are positioned. Similarly three coils 46, 47 and 48 connected in a Y to the three-phase source provide a field for pickup coils 49, 50 and 51. The pickup coils 43, 44, 45, 49, 50 and 51 may all be mounted on a single carriage 52 for movement in unison.

As the fields produced by the coils 40, 41 and 42, for example, are spaced in phase by 120° because of the three-phase source, the phase of the voltages induced in the pickup coils 43, 44 and 45 will differ as the carriage 52 is moved to change the position of the pickup coils with respect to the fields. The coils 43, 44 and 45 may have cores therein so that the voltages thereacross will be of pulse wave form to provide a precise control of the thyratrons connected thereto. It will be noted that the coils 43, 44 and 45 are connected to the thyratrons associated with ignitrons 23, 28 and 32 which are of one polarity, and the coils 49, 50 and 51 are connected to the thyratrons associated with the ignitrons 24, 29 and 33 which are connected in the opposite polarity.

The carriage 52 may be controlled in various different ways, such as by an air piston and cylinder as is illustrated. The piston 55 operates in a cylinder 56 to which air is supplied through a valve structure 57. The valve includes a shaft 58 with enlarged members 59 and 60 thereon which are so positioned that air may be applied from a source 61 through the passages 62 and 65 to move the piston 55. In the position shown in the drawing the passage 62 is open so that the piston 55 will move to the right. The extent of movement of the piston is limited by stops 63 and 64 to thereby control the positioning of the carriage 52 when either the passage 62 or the passage 65 is open. Since the pickup coils 43, 44, 45, 49, 50 and 51 are mounted on the carriage 52, the position of the carriage as defined by the stops 63 and 64 will control the position of the pickup coils with respect to the coils connected to the alternating current source. This relative position of the pickup coils with respect to the energizing coils controls the phase of the pulses produced therein. By adjustment of the stops 63 and 64 the phase of the pulses produced can be adjusted as desired.

The valve 57 is controlled by a solenoid 66 and spring 67. When the solenoid 66 is actuated, as shown, the control shaft 58 of the valve is moved to the left. When the solenoid is released, the spring 67 will pull the shaft 58 to the right so that the passage 65 will open and air from the source 61 will force the piston 55 to the left to thereby change the position of the carriage 52 and change the phase of the pulses from the pickup coils supported thereon.

For controlling the operation of the solenoid 66, controlling elements may be provided which are shown schematically in block diagram. The block 70 represents the master control which will be energized for the duration of a welding pulse. If, for example, a welding pulse of the durations indicated by the curve 71 is desired, the unit 70 will be energized for this duration. The unit 70 is effective to provide a ground through conductor 72 to the shaft 52 to complete the circuit of the coils 43, 44, 45, 49, 50 and 51. Accordingly, until this ground is provided, no pulses can be applied from the coils to the grids of the thyratrons 35 since the other side of the coils will be open. This ground connection therefore in effect renders the system operative. The unit 70 will also control a secondary unit 73 which produces intermittent pulses for energizing the solenoid 66 as indicated by the wave form 74. The pulse wave 74 will continue for the duration of the pulse 76.

The pulses of the wave 74 may be of fixed relatively short duration, and the length of each pulse and interval therebetween may be the same so that the time solenoid 66 is actuated is the same as the time during which it is released. This will cause operation of the shaft 52 back and forth with the shaft remaining at each position for the same period of time. By properly positioning the stops 63 and 64, the position of the pulse producing coils can be set to provide a desired welding current. The position of the two sets of coils are arranged so that current will be produced in one polarity when the shaft is in one position, and then immediately reversed and produced in the opposite polarity when the shaft is in the other position. Because of the rapid reversals in current, the two pulses will follow each other very closely so that the effect in the welding electrodes will be substantially the same as a continuous pulse. That is, there will be no substantial cooling between the pulses since the pulses of opposite polarity will follow immediately. It is obvious that because of this, pulses of short duration can be used instead of pulses of longer duration as previously required and therefore the welding transformer 15 may have a relatively small core since the current of each polarity is produced therein for only short periods and there problem of core saturation is substantially eliminated.

Figure 3:
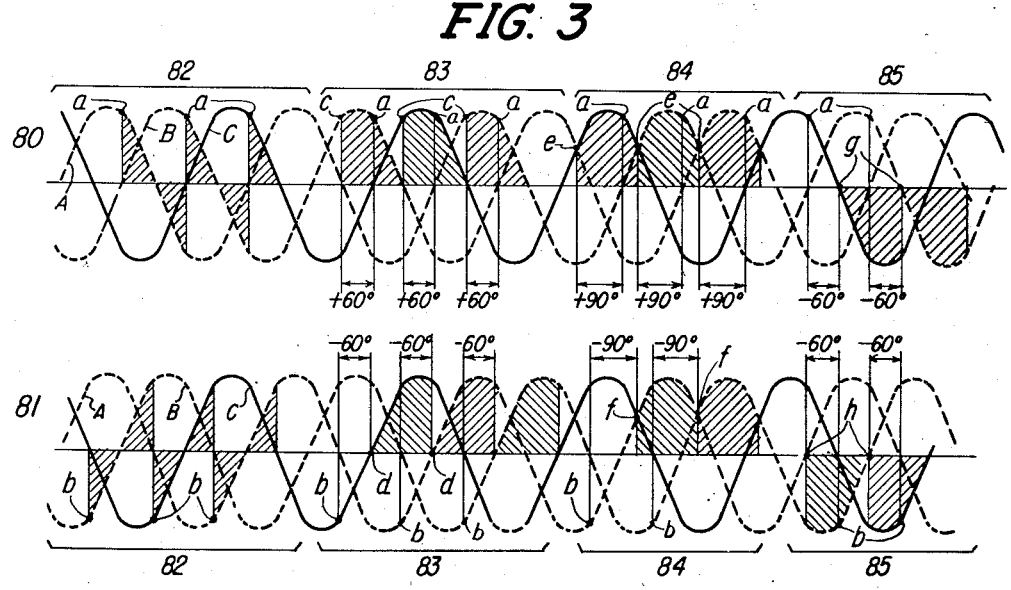
Fig. 3 is a plurality of curves showing the operation of the system.

Reference is made to Fig. 3 which shows the operation of the welding system. In accordance with this system all of the ignitrons 23, 24, 28, 29, 32 and 33 are constantly controlled. Diagram 80 illustrates the operation of the ignitrons 23, 28 and 32 which may be rendered conducting during the positive half cycles of the voltage wave of the respective phases to supply current from the three-phase source to the welding electrodes 20. The curves A, B and C of the diagram 80 show the voltage waves on the anodes of the ignitrons 23, 28 and 32 with respect to their cathodes when the ignitrons are not fired. The wave forms will change when the ignitrons are fired because of the voltages across the primary windings 16, 17 and 18, and because of the voltages in the inductors 21, 22, 26, 27, 30 and 31. The shaded areas represent the time when the ignitrons are conducting. In order that the diagrams 80 and 81 may be similar, the curves of diagram 81 show the voltages on the cathodes of the ignitrons 24, 29 and 33, which are directly connected to the anodes of ignitrons 23, 28 and 32 and are therefore at the same potential as these anodes.

The portions 82 of the diagrams 80 and 81 illustrate the condition when the ignitrons are rendered conducting an equal amount during the positive and negative half cycle so that the net output current is zero. This is the condition of the system when no welding current is required. The ignitrons of the group represented by 80 all start to conduct at the same points on the waves supplied thereto which are designated $a$. Similarly the ignitrons illustrated at 81 conduct at points $b$, which are at the same positions on the individual waves A, B and C.

The portions 83 of the diagrams illustrate the operation of the set of ignitrons shown by diagram 80 as rectifiers so that they feed current into the welding transformer. That is, the ignitrons conduct at points c advanced in phase by 60° with respect to the zero power position a. This results in conduction of the ignitrons over the relatively large shaded portions illustrated. At this same time the ignitrons of opposite polarity represented by diagram 81 will conduct at point d shifted by 60° in the opposite sense from the zero power position e, and these ignitrons will act as inverters. Accordingly, these ignitrons will supplement the action of the ignitrons of the first group to prepare the same for the following reversal of current.

The sections 84 of the diagrams are similar to the section 83 except the phase angle is displaced by a greater extent, with angles of 90° being shown which provide maximum power. It is to be pointed out that angles of 90° are the theoretical limit and angles smaller than this must be used in practice. In sections 84 the ignitrons of the group shown in diagram 80 conduct at points e, and the ignitrons of the group shown in diagram 81 conduct at points f.

The portions 85 of the diagrams show the opposite condition wherein the first group of ignitrons represented by diagram 80 are shifted 60° in the direction so that these ignitrons fire at points g and act as inverters. Conversely the ignitrons represented by diagram 81 will fire at point h which is in the region for rectifier action so that current of the opposite polarity is supplied to the load. That is, by changing from the conditions shown by portions 83 and 84 of the diagram to the condition shown by portions 85 results in a reversal of the direction of current. In either case, however, this current is contributed to by all of the ignitrons with one set operating as rectifiers and the other as inverters.

Figure 4:
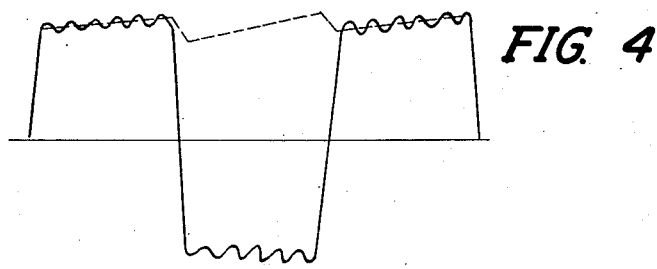
Fig. 4 shows the output current wave produced.

The action of the ignitrons described above is generally referred to as cycloconverter action and is made possible because of the coils 21, 22, 26, 27, 30 and 31. The coils, or inductors, prevent short circuiting (cross firing) of the power supply when the two groups of ignitrons are used together. The use of the two groups together, as described, makes it possible to provide very rapid changes of current in the welding transformer. This is illustrated by Fig. 4 which illustrates three half cycles which are produced by shifting the pickup coils of the phase shifting system shown in Fig. 1 between their extreme positions. It will be noted that the change of phase is so rapid that the effect is substantially the same as that of a continuous pulse. This is illustrated by the dotted line which shows the welding effect which remains substantially constant as the current wave actually reverses.

It is therefore seen that there is provided in accordance with the invention a welding system wherein welding current is provided from a three-phase source with the current being furnished as pulses of relatively short duration so that saturation of the welding transformer does not take place. This makes it possible to use relatively small transformer structures and at the same time achieve the advantage of long welding pulses. Actually, the pulses may be made of a convenient duration for the equipment being utilized and repeated through several cycles to provide the desired welding action.

The overall system is relatively simple since a single power transformer is required and the coupling inductances may be all provided on a single core to thereby make an inexpensive structure. The control equipment for the ignitrons is quite simple and may be completely controlled through a simple phase shifting structure. It is to be pointed out that the phase shifting structure illustrated is only one example of structures which may be used.

Although one embodiment of the invention has been disclosed which is illustrative thereof, it is obvious that various changes and modifications can be made therein without departing from the intended scope of the invention as defined in the appended claims.

I claim:

1. Apparatus for electrode resistance welding of metals adapted to operate from a three-phase source of alternating current, said apparatus including in combination, a welding transformer including first, second and third primary windings and a secondary winding, a load circuit coupled to said secondary winding, power circuit means connecting said primary windings to the three-phase alternating current source, said power circuit means including circuit portions having first and second rectifier elements and inductance means connected in series with each primary winding across one phase of the source, said first and second rectifier elements of each circuit portion being connected in opposite polarities and including control electrodes for rendering the same conducting, control circuit means including a plurality of portions individually associated with said rectifier elements and connected to said control electrodes thereof for selectively rendering said rectifier elements conducting, said control circuit means being connected to the three-phase source and providing voltage pulses in said portions thereof having predetermined phase relations with the phase of said source, and means for controlling the phase of said pulses in accordance with the wave form of the current desired in said load circuit, so that the pulses applied to said control electrode of each rectifier element renders the same conducting during a predetermined part of each cycle of the voltage wave applied thereto by said power circuit means, to thereby control the wave form of the current in said load circuit.

2. Apparatus for electric resistance welding of metals adapted to operate from a three-phase source of alternating current, said apparatus including in combination, a welding transformer including first, second and third primary windings and a secondary winding, a load circuit coupled to said secondary winding, power circuit means connecting said primary windings to the three-phase alternating current source, said power circuit means including circuit portions having first and second rectifier elements and inductance means connected in series with each primary winding across one phase of the source, said first and second rectifier elements of each circuit portion being connected in opposite polarities and including control electrodes for rendering the same conducting, control circuit means including a plurality of portions individually associated with said rectifier elements and connected to said control electrodes thereof for selectively rendering said rectifier elements conducting, said control circuit means being connected to the three-phase source and including a portion operative between first and second positions for providing first and second groups of voltage pulses in said portions thereof, said pulses of said first group having predetermined phase relations with the phase of said source, such that said rectifier elements are rendered conducting to produce a continuous pulse of one polarity in said load circuit, said pulses of said second group having different phase relations with the phase of said source such that said rectifier elements are rendered conducting to produce a continuous pulse of opposite polarity to said one polarity, said portion of said control circuit means being movable between said first and second positions at a repetition rate much less than the frequency of said source, and being moved from one position to the next very rapidly.

3. Apparatus for electric resistance welding of metals which is adapted to operate from a three-phase source of alternating current, said apparatus including in combination, a welding transformer including first, second and third primary windings and a secondary winding, a load circuit coupled to said secondary winding, power circuit means connecting said primary windings to the three-phase alternating current source, said power circuit means including first, second and third circuit portions individually connecting said primary windings across the three phases of the source, each of said circuit portions including first and second rectifier units connected in series with inductance means, with said first and second rectifier units of each circuit portion being connected in parallel and in opposite polarities, each of said rectifier units including control elements for rendering the same conducting, control circuit means including a plurality of control portions individually associated with said rectifier units and connected to said control elements thereof for selectively rendering said rectifier units conducting, said control circuit means being connected to the three-phase source and providing voltage pulses in said control portions thereof having predetermined phase relations with the phase of said source, and means for controlling the phase of said pulses in accordance with the wave form of the current desired in said load circuit, so that the pulses applied to said control elements of each rectifier unit render the same conducting during a predetermined part of each cycle of the voltage wave applied thereto by said power circuit means, to thereby control the wave form of the current in said load circuit.

4. Apparatus for electric resistance welding of metals which is adapted to operate from a three-phase source of alternating current, said apparatus including in combination, a welding transformer including first, second and third primary windings and a secondary winding, a load circuit coupled to said secondary winding, power circuit means connecting said primary windings to the three-phase alternating current source, said power circuit means including first, second and third circuit portions individually connecting said primary windings across the three phases of the source, each of said circuit portions including first and second rectifier units connected in series with first and second inductance means respectively, said first and second inductance means of said first, second and third circuit portions being formed by three center tapped windings provided on a single core, said first rectifier element and said first inductance means of each circuit portion being connected in parallel with said second rectifier element and said second inductance means thereof and with said rectifier elements being connected in opposite polarities, each of said rectifier units including control elements for rendering the same conducting, control circuit means including a plurality of control portions individually associated with said rectifier units and connected to said control elements thereof for selectively rendering said rectifier units conducting, said control circuit means being connected to the three-phase source and providing voltage pulses in said control portions thereof having predetermined phase relations with the phase of said source, and means for controlling the phase of said voltage pulses so that said rectifier units are conducting during a predetermined part of each cycle of the voltage wave applied thereto by said power circuit means to thereby provide rapid changes of current in said load circuit.

5. Apparatus for electric resistance welding of metals which is adapted to operate from a three-phase source of alternating current, said apparatus including in combination, a welding transformer including first, second and third primary windings and a secondary winding, a load circuit coupled to said secondary winding, power circuit means connecting said primary windings to the three-phase alternating current source, said power circuit means including first, second and third circuit portions individually connecting said primary windings across the three phases of the source, each of said circuit portions including first and second rectifier units connected in series with first and second inductance means respectively, said first and second inductance means of said first, second and third circuit portions being formed by three center tapped windings provided on a single core, said first rectifier element and said first inductance means of each circuit portion being connected in parallel with said second rectifier element and said second inductance means thereof, with said rectifier elements being connected in opposite polarities, each of said rectifier units including control elements for rendering the same conducting, control circuit means including a plurality of control portions individually associated with said rectifier units and connected to said control elements thereof for selectively rendering said rectifier units conducting, said control circuit means being connected to the three-phase source and providing voltage pulses in said control portions thereof having predetermined phase relations with the phase of said source, and means for controlling the phase of said voltage pulses to provide pulses having a first predetermined relationship with the phase of said source for rendering said rectifier units conducting during predetermined parts of each cycle of the voltage wave applied thereto by said power circuit means to provide current of one polarity in said load circuit, and pulses having a second predetermined relationship with the phase of said source for rendering said rectifier units conducting during different parts of each cycle to provide current of opposite polarity in said load circuit.

6. Apparatus for electric resistance welding of metals which is adapted to operate from a three-phase source of alternating current, said apparatus including in combination, a welding transformer including first, second and third primary windings and a secondary winding, a load circuit coupled to said secondary winding, power circuit means connecting said primary windings to the three-phase alternating current source, said power circuit means including first, second and third circuit portions individually connecting said primary windings across the three phases of the source, each of said circuit portions including first and second rectifier units connected in series with inductance means, with said first and second rectifier units of each circuit portion being connected in parallel and in opposite polarities, each of said rectifier units including control elements for rendering the same conducting, control circuit means including a plurality of control portions individually associated with said rectifier units and connected to said control elements thereof for selectively rendering said rectifier units conducting, said control circuit means being connected to the three-phase source and providing voltage pulses in said control portions thereof having predetermined phase relations with the phase of said source, and means for controlling the phase of said pulses from a first phase relationship which render said rectifier units conducting to provide a current of one polarity in said load current to a second phase relationship which renders said rectifier units conducting to provide a current of the opposite polarity in said load circuit, with the current in said load circuit changing rapidly from one polarity to the other so that the welding effect thereof is not substantially interrupted.

7. Apparatus for electric resistance welding of metals adapted to operate from a three-phase source of alternating current, said apparatus including in combination, a welding transformer including primary winding means and a secondary winding, a load circuit coupled to said secondary winding, frequency changing means for connecting said primary winding means to the three-phase alternating current source including a pair of rectifier elements connected in opposite polarity and inductance means in series with a portion of said primary winding means across each phase of the source, said rectifier elements having control electrodes for rendering the same conducting, and control circuit means for producing pulses varying in phase with respect to the alternating current source in accordance with a predetermined welding current wave form, said control circuit means including portions connected to said control electrode of said rectifier elements and applying said pulses thereto for selectively rendering said rectifier elements conducting, whereby said pulses control the time of operation of said rectifier elements to produce a current wave in said load circuit which substantially corresponds to said predetermined wave form.

8. Apparatus for electric resistance welding of metals adapted to operate from a source of alternating current, said apparatus including in combination, a welding transformer including primary winding means and a secondary winding, a load circuit coupled to said secondary winding, frequency changing means for connecting said primary winding means to the alternating current source including a plurality of portions each having a pair of rectifier elements connected in opposite polarity and an inductor connected in series with a portion of said primary winding means to the source, said rectifier elements having control electrodes for rendering the same conducting, and control circuit means for producing pulses varying in phase with respect to the alternating current source in accordance with a predetermined welding current wave form, said control circuit means including portions connected to said control portions of said rectifier elements and applying said pulses thereto for selectively rendering said rectifier elements conducting, said control circuit means being operative between first and second conditions which render said rectifier elements conducting to produce currents in said load circuit of first and second opposite polarities respectively.

9. Apparatus for electric resistance welding of metals adapted to operate from a three-phase source of alternating current, said apparatus including in combination, a welding transformer including first, second and third primary windings and a secondary winding, a load circuit coupled to said secondary winding, power circuit means connecting said primary windings to the three-phase alternating current source, said power circuit means including first, second and third circuit portions individually connecting said primary windings across the three phases of the source, each of said circuit portions including first and second rectifier units connected in series with inductance means, with said first and second rectifier units of each circuit portion being connected in parallel in opposite polarities, each of said rectifier units including control elements for rendering the same conducting, control circuit means including a plurality of control portions individually associated with said rectifier units and connected to said control elements thereof for selectively rendering said rectifier units conducting, said control circuit means being connected to the three-phase source and providing voltage pulses in said control portions thereof having predetermined phase relations with the phase of said source, phasing means coupled to said control circuit for controlling the phase of said pulses thereof, said phasing means having a portion movable from a first position wherein the pulses render said rectifier units conducting to produce a current of one polarity in said load circuit to a second position wherein the pulses render said rectifier units conducting to produce a current of opposite polarity, and means for continuously moving said last named portion between said first and second positions for the period of time during which continuous welding action is desired.

10. Apparatus for electric resistance welding of metals adapted to operate from a three-phase source of alternating current, said apparatus including in combination, a welding transformer including first, second and third primary windings and a secondary winding, a load circuit coupled to said secondary winding, power circuit means connecting said primary windings to the three-phase alternating current source, said power circuit means including first, second and third circuit portions individually connecting said primary windings across the three phases of the source, each of said circuit portions including first and second rectifier units connected in series with inductance means, with said first and second rectifier units of each circuit portion being connected in parallel in opposite polarities, each of said rectifier units including control elements for rendering the same conducting, control circuit means including a plurality of control portions individually associated with said rectifier units and connected to said control elements thereof for selectively rendering said rectifier units conducting, said control circuit means being connected to the three-phase source and being selectively actuated to provide voltage pulses in said control portions thereof having predetermined phase relations with the phase of said source, phasing means coupled to said control circuit for controlling the phase of said pulses thereof, said phasing means having a portion movable from a first position wherein the pulses render said rectifier units conducting to produce a current of one polarity in said load circuit to a second position wherein the pulses render said rectifier units conducting to produce a current of opposite polarity, and means for actuating said control circuit means for a period of time during which continuous welding action is desired, said last named means causing continuous movement of said movable portion between said first and second positions thereof at a rate substantially less than the frequency of the source for said period of time.

11. Apparatus for electric resistance welding of metals adapted to operate from a source of alternating current, said apparatus including in combination, a welding transformer including a plurality of primary windings and a secondary winding, a load circuit coupled to said secondary winding, power circuit means connecting said primary windings to the alternating current source, said power circuit means including a plurality of circuit portions respectively connected in series with said primary windings and each having series connected rectifier means and inductance means, said rectifier means of each circuit portion including first and second rectifier elements connected with opposite polarities and including control electrodes for rendering the same conducting, control circuit means including a plurality of portions individually associated with said rectifier elements and connected to said control electrodes thereof for selectively rendering said rectifier elements conducting, said control circuit means being connected to the source and providing voltage pulses in said portions thereof having predetermined phase relations with the phase of said source, and means for controlling the phase of said pulses in accordance with the wave form of the current desired in said load circuit, so that the pulses applied to said control electrode of each rectifier element renders the same conducting during a predetermined part of each cycle of the voltage wave applied thereto by said power circuit means, to thereby control the wave form of the current in said load circuit.

References Cited in the file of this patent

UNITED STATES PATENTS

| | | |
|---|---|---|
| 2,508,467 | Parsons et al. | May 23, 1950 |
| 2,600,519 | Solomon | June 17, 1952 |